US010451768B2

United States Patent
Devitt et al.

(10) Patent No.: US 10,451,768 B2
(45) Date of Patent: Oct. 22, 2019

(54) TECHNIQUES FOR OPTIMALLY SENSING FULL CONTAINERS

(71) Applicant: OnePlus Systems, Inc., Northbrook, IL (US)

(72) Inventors: Seamus Devitt, Malahide (IE); Brendan Walsh, Mt Merrion (IE)

(*) Notice: Subject to any disclaimer, the term of this patent is extended or adjusted under 35 U.S.C. 154(b) by 10 days.

(21) Appl. No.: 15/606,758

(22) Filed: May 26, 2017

(65) Prior Publication Data

US 2017/0363769 A1    Dec. 21, 2017

Related U.S. Application Data

(60) Provisional application No. 62/342,215, filed on May 27, 2016.

(51) Int. Cl.
*G01V 8/12* (2006.01)
*B65F 1/16* (2006.01)

(52) U.S. Cl.
CPC ............ *G01V 8/12* (2013.01); *B65F 1/16* (2013.01); *B65F 2210/1443* (2013.01); *B65F 2210/168* (2013.01)

(58) Field of Classification Search
CPC .... G01V 8/10; G01V 8/12; B65F 1/16; B65F 2210/1443; B65F 2210/144; B65F 2210/168; G05B 2219/45083; G06N 3/008; A61B 19/22; A61B 19/5212; B25J 13/085
See application file for complete search history.

(56) References Cited

U.S. PATENT DOCUMENTS

| | | | | |
|---|---|---|---|---|
| 2,125,122 | A * | 7/1938 | Mongiello | B65F 1/08 220/23.89 |
| 3,299,418 | A | 1/1967 | Treseder | |
| 3,558,181 | A | 1/1971 | Peterson | |
| 3,779,419 | A * | 12/1973 | Heitz | B65F 1/06 220/495.08 |
| 3,884,520 | A | 5/1975 | Peterson | |
| 3,901,541 | A | 8/1975 | Peterson | |
| 4,235,165 | A | 11/1980 | Fenner et al. | |
| 4,391,188 | A | 7/1983 | Gwathney et al. | |
| 4,424,740 | A | 1/1984 | Gwathney et al. | |
| 4,753,367 | A * | 6/1988 | Miller | B65F 1/06 220/495.11 |
| 5,016,197 | A | 5/1991 | Neumann et al. | |

(Continued)

FOREIGN PATENT DOCUMENTS

AT        12619 U2    9/2012
CA        1138491     12/1982
(Continued)

OTHER PUBLICATIONS

Int'l Search Report and Written Opinion dated Aug. 24, 2017 for PCT/US2017/034727.
(Continued)

*Primary Examiner* — John R Lee
(74) *Attorney, Agent, or Firm* — McAndrews Held & Malloy, Ltd.

(57) ABSTRACT

A series of techniques incorporated in two sensing methods that enable fullness detection whilst minimizing the current consumption of the battery operated wireless electronic circuitry that implements the detection.

20 Claims, 5 Drawing Sheets

(56) References Cited

U.S. PATENT DOCUMENTS

| | | | |
|---|---|---|---|
| 5,025,721 | A | 6/1991 | Spiers |
| 5,044,271 | A | 9/1991 | Robbins et al. |
| 5,119,894 | A | 6/1992 | Crawford et al. |
| 5,178,062 | A | 1/1993 | Spiers |
| 5,214,594 | A | 5/1993 | Tyler et al. |
| 5,247,880 | A | 9/1993 | Robbins |
| 5,297,481 | A | 3/1994 | Robbins et al. |
| 5,299,142 | A | 3/1994 | Brown et al. |
| 5,303,642 | A | 4/1994 | Durbin et al. |
| 5,330,307 | A | 7/1994 | Spiers et al. |
| 5,353,698 | A | 10/1994 | Robbins |
| 5,415,086 | A | 5/1995 | Robbins |
| 5,532,928 | A | 7/1996 | Stanczyk et al. |
| 5,575,201 | A | 11/1996 | Fenner et al. |
| 5,712,789 | A | 1/1998 | Radican |
| 5,746,378 | A | 5/1998 | Beadle et al. |
| 5,892,441 | A | 4/1999 | Woolley et al. |
| 5,922,040 | A | 7/1999 | Prabhakaran |
| 5,960,402 | A | 9/1999 | Embutsu et al. |
| 6,068,440 | A | 5/2000 | Lang et al. |
| 6,138,557 | A | 10/2000 | Brown et al. |
| D450,062 | S | 11/2001 | Spiers |
| 6,336,362 | B1 | 1/2002 | Duenas |
| 6,366,829 | B1 | 4/2002 | Wallace |
| 6,418,841 | B1 | 7/2002 | Little et al. |
| 6,427,585 | B1 | 8/2002 | Brown et al. |
| 6,598,094 | B1 | 7/2003 | Wollrath et al. |
| 6,919,803 | B2 | 7/2005 | Breed |
| 7,212,098 | B1 | 5/2007 | Trent et al. |
| 7,221,746 | B1 | 5/2007 | Onken et al. |
| D564,545 | S | 3/2008 | Poss et al. |
| 7,389,724 | B2 | 6/2008 | Seagraves et al. |
| 7,690,296 | B2 | 4/2010 | Seagraves et al. |
| 7,690,297 | B1 | 4/2010 | Sagen et al. |
| 7,783,380 | B2 * | 8/2010 | York ................... A47K 5/06 700/240 |
| 7,819,054 | B2 | 10/2010 | Cunningham et al. |
| 8,068,110 | B2 | 11/2011 | Li et al. |
| 8,096,235 | B2 | 1/2012 | Cunningham et al. |
| 8,479,648 | B2 | 7/2013 | Lyle et al. |
| 8,742,926 | B2 | 6/2014 | Schnittman et al. |
| 2002/0123914 | A1 | 9/2002 | Kane et al. |
| 2003/0226884 | A1 * | 12/2003 | Swider ............... A47G 29/1207 232/26 |
| 2011/0137484 | A1 | 6/2011 | Poss et al. |
| 2012/0169497 | A1 * | 7/2012 | Schnittman ......... A47L 9/106 340/540 |
| 2013/0276646 | A1 | 10/2013 | Lyle et al. |
| 2013/0278067 | A1 * | 10/2013 | Poss ................... B65F 1/0033 307/62 |
| 2015/0066782 | A1 | 3/2015 | Vainberg et al. |
| 2016/0050514 | A1 * | 2/2016 | Skocypec ............ H04W 4/006 455/68 |
| 2017/0090447 | A1 * | 3/2017 | Skocypec ........... B65B 67/1233 |
| 2017/0363769 | A1 * | 12/2017 | Devitt ................. B65F 1/16 |

FOREIGN PATENT DOCUMENTS

| | | |
|---|---|---|
| CA | 2667198 A1 | 5/2008 |
| CA | 2806876 A1 | 2/2012 |
| CA | 2891813 A1 | 5/2014 |
| DE | 4211119 A1 | 10/1992 |
| ES | 2365616 | 3/2006 |
| WO | 199945761 A1 | 9/1999 |
| WO | WO2000063864 A1 | 10/2000 |
| WO | WO2001097555 A3 | 12/2001 |
| WO | WO2008154475 A1 | 12/2008 |
| WO | WO2014099190 A1 | 6/2014 |
| WO | WO2014114469 A2 | 7/2014 |
| WO | WO2014114470 A1 | 7/2014 |
| WO | WO2015120462 A2 | 8/2015 |
| WO | WO2015120463 A1 | 8/2015 |
| WO | WO 2015/175763 | 11/2015 |

OTHER PUBLICATIONS

Trash Monitoring System Offered, PR Newswire, Jul. 29, 1985. Abstract only.

Thomas La Porta, et al., Sensor-Mission Assignment in Rechargeable Wireless Sensor Networks, ACM Transactions on Sensor Networks. No Date Given.

Thomas La Porta, et al., "Sensor-Mission Assignment in Wireless Sensor Networks with Energy Harvesting," Conference Paper, 2011 8th Annual IEEE Communications Society Conference on Sensor, Mesh and Ad Hoc Communications and Networks, Jun. 2011.

FAQs—SmartBin from www.smartbin.com, Jul. 24, 2010. Pulled from http://web.archive.org/web/20100724232902/http:/www.smarbin.com/en/support/faqs.html. Nov. 28, 2016.

Specification Summary—SmartBin from www.smartbin.com, Jul. 24, 2010. Pulled from http://web.archive.org/web/20100724232747/http:/www.smarbin.com/en/how-it-works/sensor-specifications.html. Nov. 28, 2016.

* cited by examiner

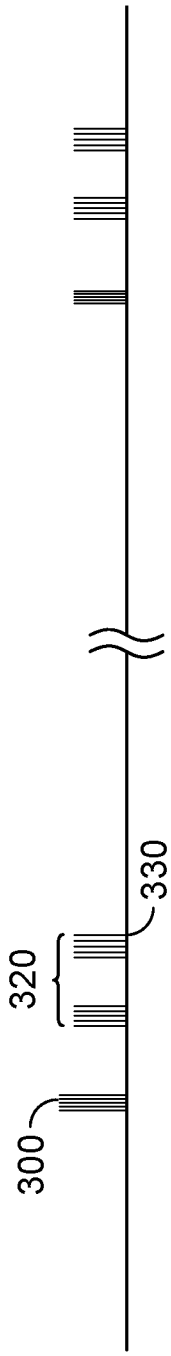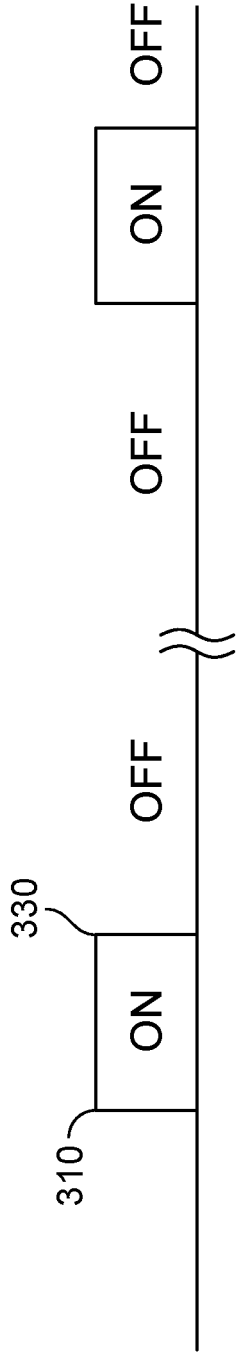
FIG. 3A
FIG. 3B
$$D = \frac{1ms}{3600s} = 0.00000028$$
FIG. 3C

TECHNIQUES FOR OPTIMALLY SENSING FULL CONTAINERS

BACKGROUND OF THE INVENTION

The present invention is in the technical field of waste management. More particularly, the present invention is in the technical field of sensing the fullness status of containers.

The fullness of containers used in waste management is an important parameter to measure if it is desired to implement an optimal servicing algorithm. Such fullness information is transmitted to a central repository, where software algorithms can then be implemented to allow the generation of optimal routing schedules for the service vehicles. Sensors that can detect the fullness level are commonplace but these sensors suffer from excessive electrical current consumption.

SUMMARY OF THE INVENTION

The present invention is a series of techniques incorporated in two sensing methods that enable fullness detection whilst minimizing the current consumption of the battery operated wireless electronic circuitry that implements the detection mechanism and wireless communication.

BRIEF DESCRIPTION OF THE DRAWINGS

FIGS. 3A and 3B and 3C are schematic diagrams of the timing particulars of a preferred embodiment of IR Emitter modules of the present invention;

DETAILED DESCRIPTION OF THE INVENTION

Figure 1B:
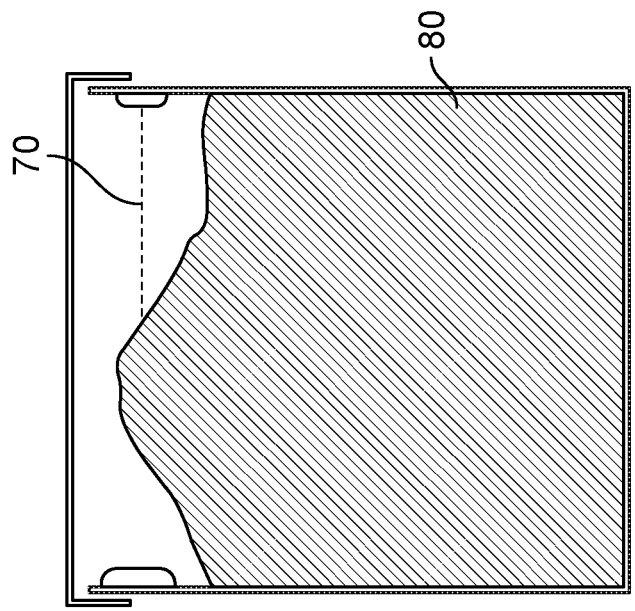
FIGS. 1A and 1B are cross-sectional views of a representative container of the invention.
Figure 1A:
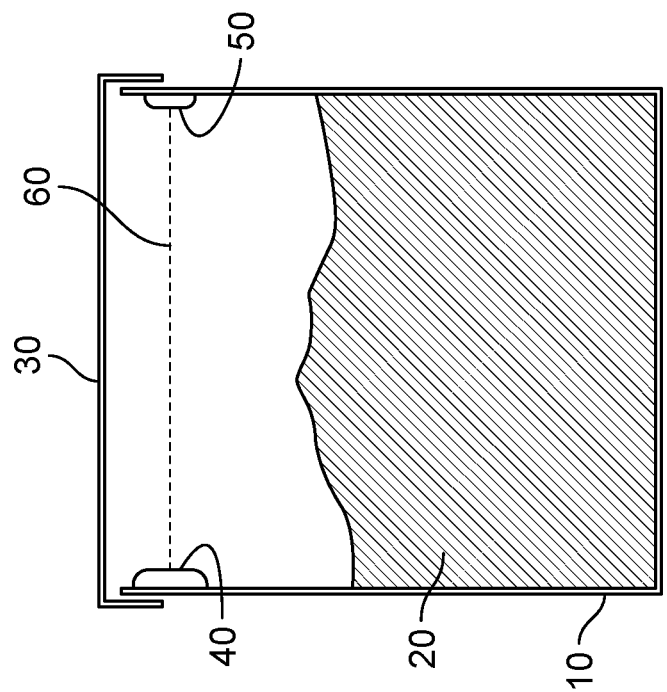

Referring now to the invention in more detail, in FIG. 1 there is shown a container 10 with substantially vertical side walls and a covering lid 30, and containing a quantum of waste material 20. The container is fitted with a pair of sensor modules, consisting of an Infra-Red Emitter module 50 and an Infra-Red Receiver module 40. The Emitter module emits a pulsed beam of near Infra-Red light modulated with a unique coding pattern according to a pre-defined timing schedule. If the container is not full beyond the limit line set by the linear line 60 connecting the emitter and receiver modules, then the unique coding pattern will be received and recognized by the Receiver module and this can be interpreted as an indication that the container is not full. Conversely, if the container is full 80 beyond the limit line set by the linear line connecting the transmitter and receiver elements, then the beam of near Infra-Red light will be blocked 70 and the unique coding pattern will not be received by the Receiver module and this can be interpreted as an indication that the container is full.

Figure 2B:
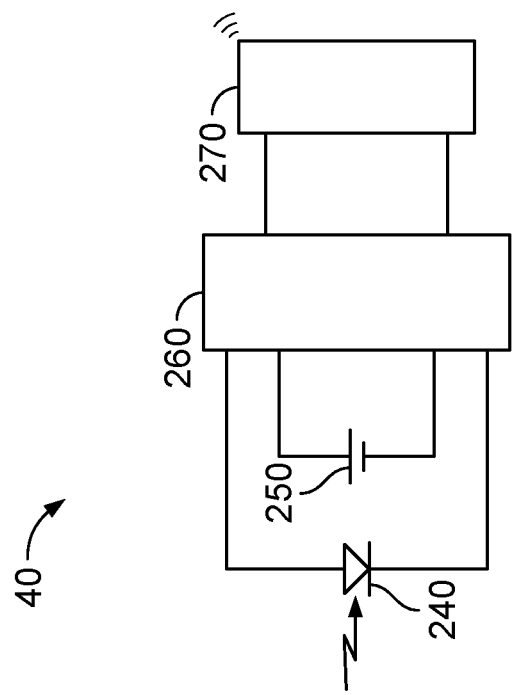
FIGS. 2A and 2B are schematic diagrams of a preferred embodiment of an IR Emitter module of the present invention.
Figure 2A:
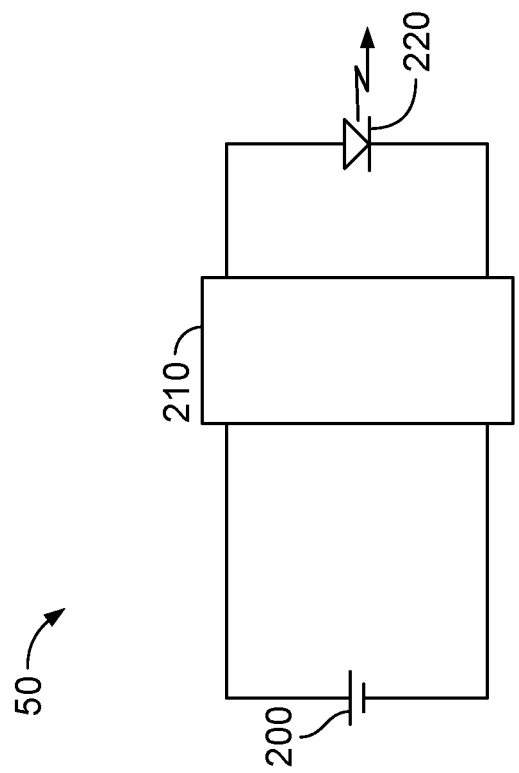

In more detail, still referring to sensing method No. 1, FIG. 2a shows that the Emitter module 50 comprises of a battery 200 and a battery powered microprocessor 210 that controls the coding pattern that is applied to an Infra-Red emitting diode 220 that emits near Infra-Red light that travels across the container and is received (or not received—depending on the fullness level of the container).

In more detail, still referring to sensing method No. 1, FIG. 2b shows that the Receiver module 40 comprises of a battery 250 and a battery powered microprocessor 260 that interprets the coding pattern that is received (or not received—depending on the fullness level of the container) by an Infra-Red Receiver diode 240. The Receiver module also incorporates a wireless communication module 270 that can transmit a summary version of the information received to an internet cloud based central repository.

Referring now to FIG. 3, there is shown a technique that ensures minimal electrical power consumption for each of the Emitter module and Receiver module. FIG. 3a shows the timing diagram of Emitter module. FIG. 3b shows the timing diagram of the Receiver module. It is to be noted that this method of synchronization of the Emitter module and Receiver module ensures minimal power consumption.

In more details, still referring to FIG. 3 and to FIG. 3a in particular, the first burst of pulses, also to be called the Wake-up Burst 300, is emitted. This has the effect of waking up the Receiver module at point 310. The Receiver module then leaves its standby state of low quiescent current consumption, and is now primed and waiting for a unique modulation code. The Emitter module, after a delay of approx. 500 uSec, then delivers a burst of near Infra-Red pulses 320 than contain a uniquely modulated code. If the Receiver module receives this code, this is confirmation that the container has not yet reached its full state. After a time (typically 1 mSec) the Emitter module turns off at point 330 and remains off (with very low <1 uAmp) quiescent current, until the next cycle which would typically be one hour later.

Referring to FIG. 3c it can be seen that the effective duty cycle of operation may be calculated as approximately 0.00000028, thus guaranteeing an exceptionally low average current draw from the batteries of both the Emitter module and the Receiver module.

Referring now to FIG. 4, sensing method No. 2 is described. This is a technique for detecting the fullness state of a container with hinged lid, as is common in the waste management industry in the form of dumpsters, wheelie bins, etc . . .

Figure 4A:
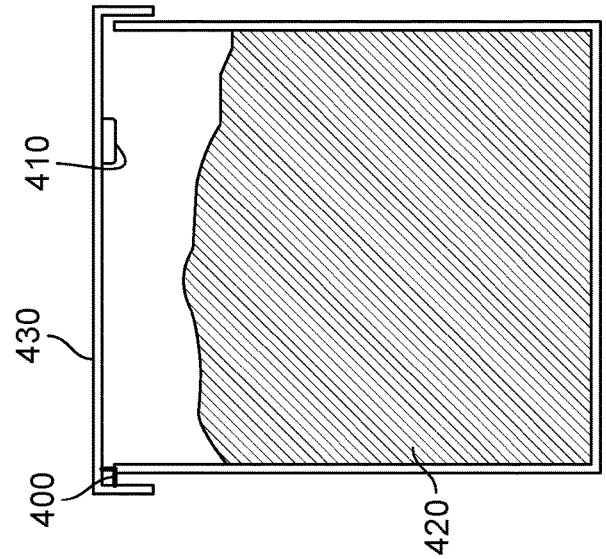
FIGS. 4A and 4B and 4C and 4D are cross-sectional views of a representative container of the invention showing various states of fullness.
Figure 4B:
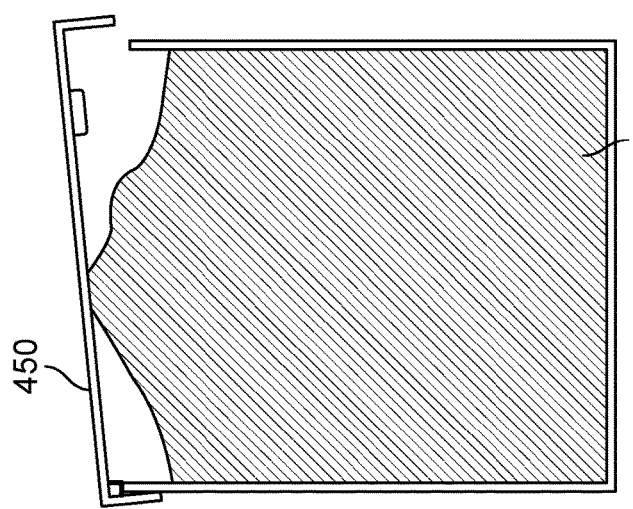
Figure 4C:
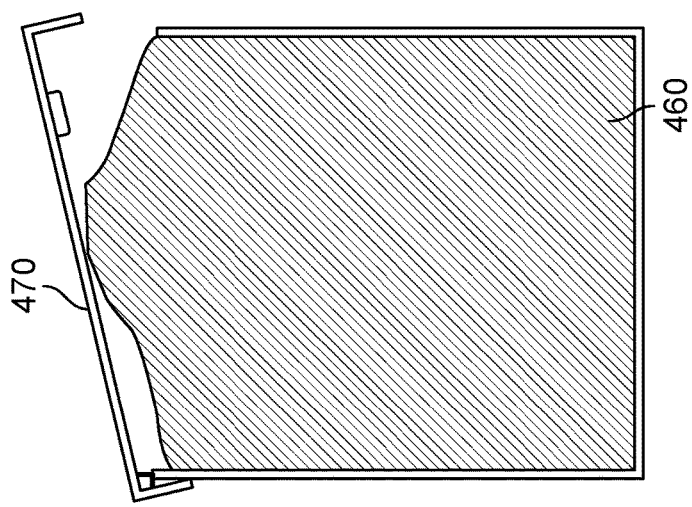

In more detail, still referring to sensing method No. 2, FIG. 4a shows a container with a waste level 420 that is below the full state. Also shown is a lid 430 mounted on a hinge 400 and a battery powered Sensing module 410 that is fitted to the lid 430 (in any position, inside or outside, close to the middle, near the back or near the front). The Sensing module 410 can detect the angle of the resting position of the lid in all 3 orthogonal axes, with the earth's gravitational axis being the primary axis. The Sensing module measures the lid's tilted position at regular frequent intervals and this information is transmitted to a cloud based server. From the information received, the computing server can interpret the normal resting position of the lid, and this information becomes the reference position. When the container is filled to the point where the lid cannot rest at its normal resting angle, as illustrated in FIG. 4b with lid in position 450 and as illustrated in FIG. 4c with lid in position 470, the Sensing module can interpret this as a full container as in FIG. 4b, or as an over-full container as in FIG. 4c.

Figure 4D:
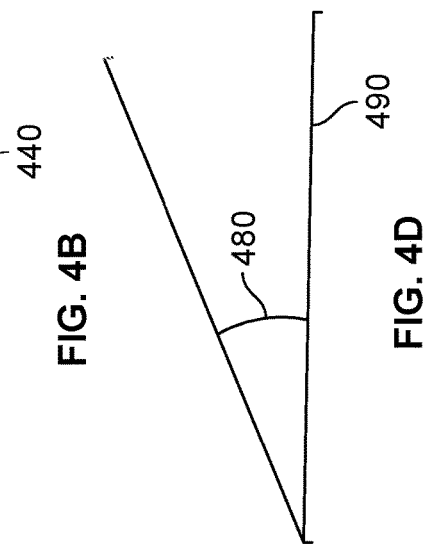

Further, by interpretation of the lid angle 480 and by comparison with the reference resting position 490, as shown in FIG. 4d, it is possible to assess the degree or amount of over-fullness. It should be noted that this technique works also for non-horizontal reference positions.

Optionally the Sensing module 410 may also be fitted with a shock detection measurement device which can be activated by a lid opening act and such lid opening acts may be quantified both in terms of their frequency and also in terms of their amplitude. Such information may be used by the computing server to assess the user activity for the container being monitored.

Figure 5:
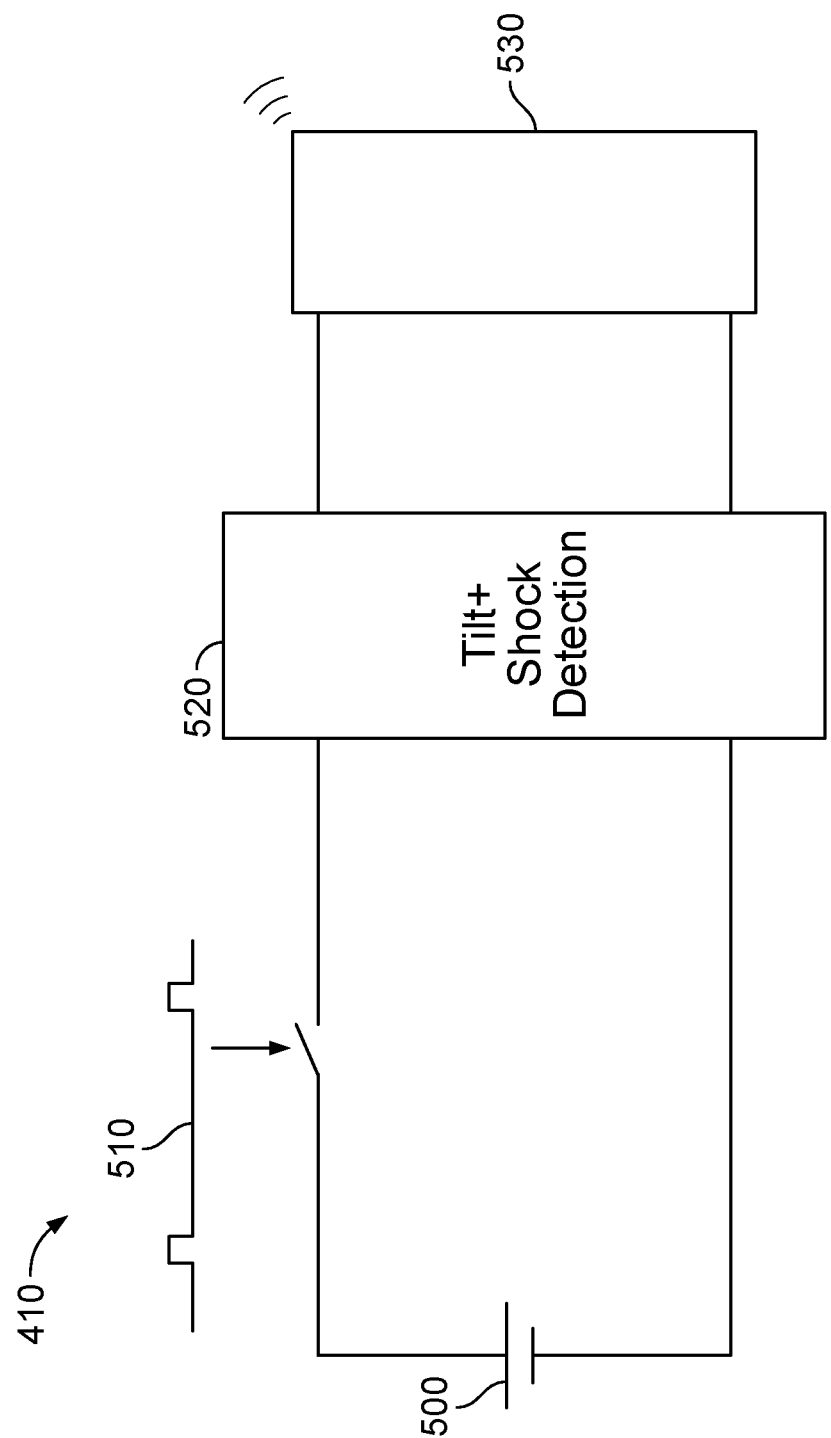
FIG. 5 is a schematic diagram of a sensing module of the present invention.

In more detail, still referring to sensing method No. 2, FIG. 5 shows that the Sensing module 410, comprising a battery 500 and a battery powered microprocessor 520 that detects title angle and shock. The microprocessor is powered according to an activation pattern 520 that ensures both very low duty cycle of operation and minimal on time when activated by a lid opening activation. The Sensing module also incorporates a wireless communication module 530 that can transmit a summary version of the information received to an internet cloud based central repository.

The advantages of the present invention include, without limitation, that the sensing modules used in each embodiment of the invention can use exceedingly low levels of electrical current, and consequently can use batteries of much lower capacity than would otherwise be used. The invention enables detection of full containers with exceedingly small and easily installed Sensing modules. The invention enables the operation of an Infra-Red sensing technique that is immune to erroneous readings. The invention also allows the use of Sensing modules where the positioning of the Sensing module is not critical. The invention further generates valuable data in relation to user activity of such containers. Such information can be fed into service prediction algorithms providing further insight into the operation of important waste container assets.

In broad embodiment, the present invention is a series of techniques that enable low cost and low energy consumption detection of container fullness.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

The invention claimed is:

1. A system for sensing full containers, comprising:
   an infra-red (IR) emitter module programmed to emit a wake-up signal and coded signals, the IR emitter being secured within a container capable of containing waste material and having side walls and an openable lid; and
   an IR receiver module secured within the container, the IR emitter and the IR receiver modules arranged on one or more of the side walls within the container such that a horizonal line between the modules represents a full container,
   wherein each modules is operable to automatically be placed into a power saving mode, and the IR receiver module operable to be removed from the power saving mode by receipt of the wake-up signal emitted by the IR emitter module, and
   wherein the level of fullness of the container is determined by receipt or non-receipt of the coded signals by the IR receiving module within a predetermined amount of time after waking up.

2. The system of claim 1, wherein the IR receiver module comprises a wireless communication module.

3. The system of claim 2, wherein the IR receiver is operable to transmit summary information corresponding to the level of fullness of the container to a central repository via the wireless communication module.

4. The system of claim 3, wherein the summary information corresponds to the container being full when the coded signals are not received within a predetermined amount of time.

5. The system of claim 3, wherein the summary information corresponds to the container not being full when the coded signals are received within a predetermined amount of time.

6. The system of claim 1, wherein the IR emitter module further comprises an IR emitting diode to emit the wake-up signal and the coded signals to the IR receiver.

7. The system of claim 1, wherein The IR emitter is operable to:
   deliver the wake-up signal as a first IR pulse to the IR receiver module;
   deliver a second IR pulse containing the coded signal after a predetermined delay following the first IR pulse; and
   enter into the power saving mode after a predetermined amount of time following the second IR pulse.

8. The system of claim 1, wherein the IR receiver module further comprises an IR receiving diode to receive the wake-up signal and the coded signals from the IR emitter.

9. The system of claim 1, further comprising one or more rechargeable batteries operably connected to the modules.

10. A system for sensing full containers, comprising a sensing module secured to an openable lid of a container capable of containing waste material, the sensing module operable to:
    automatically be placed into a power saving mode and to be removed from the power saving mode according to a predetermined time interval; and
    detect an angle of the resting position of the lid, wherein the level of fullness of the container is based on the detected angle of the resting lid.

11. The system of claim 10, wherein the sensing module comprises a wireless communication module.

12. The system of claim 11, the sensing module further to transmit information corresponding to the detected angle of the resting lid via the wireless communication module to a server.

13. The system of claim 12, wherein the server is operable to interpret the information to determine a normal resting angle of the lid.

14. The system of claim 13, wherein the server is further operable to compare the information corresponding to the detected angle to the normal resting angle to determine a level of fullness of the container.

15. The system of claim 14, wherein the information corresponds to the container being full when the tilt angle is greater than the normal resting angle.

16. The system of claim 14, wherein the information corresponds to the container not being full when the tilt angle is similar to the normal resting angle.

17. The system of claim 10, wherein the sensing module comprises a shock detection measurement device operable to be activated by a lid opening act.

18. The system of claim 17, wherein the sensing module is further to transmit information corresponding to the lid opening acts to a server, the server operable to assess the frequency and amplitude of the lid opening acts.

19. The system of claim 18, wherein the server is further operable to implement a prediction algorithm to assess user activity based on the assessed frequency and amplitude of the lid opening acts.

20. The system of claim 10, wherein the sensor module is operable to detect the angle of the lid in three orthogonal axes, gravitational axis being a primary axis.

* * * * *